United States Patent
Collins

[11] 3,850,720
[45] Nov. 26, 1974

[54] METHOD OF BONDING A BALLOON SLEEVE TO A CATHETER LUMEN TUBE

[75] Inventor: Michael Henry Collins, Tring Herts, England

[73] Assignee: G. D. Searle & Co., Ltd., Bucks, England

[22] Filed: Jan. 26, 1973

[21] Appl. No.: 327,200

[30] Foreign Application Priority Data
Feb. 1, 1972 Great Britain.................. 4757/72
Feb. 1, 1972 Great Britain.................. 4758/72
Feb. 1, 1972 Great Britain.................. 4760/72

[52] U.S. Cl.......... 156/155, 128/349 B, 128/349 R, 156/229, 156/292, 156/294, 156/308, 161/139, 161/407, 285/97, 285/235, 285/236
[51] Int. Cl...................... B32b 31/00, A61m 25/00
[58] Field of Search..... 128/349 B, 349 R; 156/229, 156/289, 292, 294, 308, 284, 155; 161/139, 407; 285/97, 235, 236

[56] References Cited
UNITED STATES PATENTS

| | | |
|---|---|---|
| 2,234,611 | 3/1941 | Trumbull.......................... 161/240 |
| 2,308,484 | 1/1943 | Auzin et al. ..................... 156/294 X |
| 3,304,353 | 2/1967 | Harautuneian ...................... 264/98 |
| 3,329,548 | 7/1967 | Blatz................................. 156/251 |
| 3,467,103 | 9/1969 | McKinstry et al............... 128/349 B |
| 3,528,869 | 9/1970 | Dereniuk ........................... 156/294 |
| 3,544,668 | 12/1970 | Dereniuk ........................... 264/135 |
| 3,625,793 | 12/1971 | Sheridan et al..................... 156/229 |

Primary Examiner—Charles E. Van Horn
Assistant Examiner—Robert A. Dawson
Attorney, Agent, or Firm—John A. Dhuey

[57] ABSTRACT

Improved Foley type catheters are produced from a plasticized polyvinyl chloride lumen tube and a latex rubber inflation sleeve by coating the interior of the inflation sleeve with powdered polyvinyl chloride before its placement on the lumen tube, halogenating the end margins of the inflation balloon to provide adhesion between the balloon and the lumen tube and maintaining contact pressure on the end margins of the balloon sleeves during the adhesion step by means of elastic bands.

5 Claims, 7 Drawing Figures 3,850,720

METHOD OF BONDING A BALLOON SLEEVE TO A CATHETER LUMEN TUBE

This invention relates generally to the manufacture of catheters and like devices, such as endotracheal tubes, having a balloon which is inflatable by a suitable fluid, such as water or air, the Foley type catheter being one such well known device. Such devices will hereinafter be generically referred to as 'catheters'. More particularly, the invention is concerned with a process for manufacturing catheters with improved adhesion between the latex inflation balloon and a polyvinyl halide lumen tube.

Catheters are well known which are constructed with a lumen tube having a main, e.g., drainage, lumen, and an inflation lumen and with a sleeve which is adhered at each end to the lumen tube and can be inflated by fluid passed through the inflation lumen to form a balloon.

The former practice was to make both the lumen tube and the balloon sleeve of rubber, but a method now favored is to make the lumen tube of a material having considerably higher polar properties than that of the balloon sleeve, e.g., to make the lumen tube of a thermoplastics material such as plasticized polyvinyl chloride and the balloon sleeve of an elastomeric material such as natural rubber, polyisoprene or a thermoplastic rubber.

Difficulties often arise in attempting to produce a securely sealed adhesive bond between the more highly polar tube material and the less polar balloon sleeve. Initial attempts to solve this problem utilized a halogenation process for bonding rubber to polyvinyl halides, which process was described in U.S. Pat. No. 2,234,611. For example, U.S. Pat. No. 3,467,103 discloses the utilization of the halogenation procedure for bonding a latex rubber inflation sleeve and a latex inflation arm to a polyvinyl chloride tube.

However, even with the above halogenation procedure, certain difficulties remain in the formation of a suitable bond between the inflation balloon and the tube. It is the principle object of this invention to provide an improved process for the manufacture of catheters which have a secure bond between the inflation balloon and the lumen tube.

Generally, it is difficult to place the latex inflation balloon on the tube because of the tacky nature of the latex and the close fit required between the latex balloon and the tube. To overcome the tackiness of the latex, French chalk or talc often is dusted onto the interior surface of the sleeve, thus following the sleeve to be more easily drawn onto the tube. However, the French chalk or talc is very difficult to remove and the residue remaining after cleaning often interferes with the formation of a statisfactory bond between the sleeve and the tube. To overcome this problem it has been discovered that, if one uses a finely powdered plastic, preferably of the same material as the tube, in place of the chalk or talc, the sleeve can be slipped easily onto the tube. After the sleeve and tube assembly is completed, the powdered plastic is removed by a cleaning solvent, such as cyclohexanone, in which it is soluble. Consequently, by utilizing the above improvement, no material remains between the latex sleeve and the tube to affect the bond characteristics and a secure bond is achieved.

It also has been discovered that an improved seal is afforded when contact pressure is maintained on the marginal edges of the sleeve during the adhesive sealing step. This contact pressure preferably is maintained by means of endless elastic bands which, in their unstressed configuration, have an interior diameter smaller than the outside diameter of the tube. It has been found particularly useful to place the bands in a position such that a portion of the band is placed on the inflation sleeve and a portion of the band is placed over the lumen tube. In that manner the tapered portion of the inflation sleeve can be caused to merge with the tube and minimize any edge projection which results between the inflation sleeve and outer surface of the lumen tube.

Thus, the invention provides a method of producing a catheter in which end margins of a balloon sleeve are securely adhesively bonded to a lumen tube of a material having higher polar properties than that of the sleeve. In general, the overall process consists of dusting the balloon sleeve with a plastic powder, locating the sleeve in position around the tube, then exposing at least the surface regions of the balloon sleeve which are to be secured to the tube to a halogen (e.g. chlorine) medium and subsequently securing said regions to the tube adhesively and maintaining contact pressure with elastic bands.

The balloon sleeve is preferably of a prevulcanized natural rubber and the lumen tube of a plasticized material such as polyvinyl chloride.

The end margins of the located sleeve may be turned back, preferably after assembly to the lumen tube, and at least the region of the tube surrounded by the sleeve or this region and the exposed adjacent regions of the tube, immersed in a halogen, preferably chlorine, solution, e.g., by dipping the distal end of the tube into the solution. Following removal from the solution and drying, adhesive is applied to the turned back end margins of the sleeve and/or the regions of the tube to which they are to be adhered and the end margins folded down onto the tube into adhesive contact therewith. Drying then ensues, e.g., at room temperature or at an elevated temperature, and any residual solvent is removed and solvent in the adhesive allowed to penetrate through the rubber of the sleeve. Finally contact pressure may be maintained between the end margins of the sleeve and the tube, and this may conveniently be effected by means of an elastic pressure band applied over the sleeve or by two separate bands one over each end of the sleeve and of a width to extend over the adhered end margins of the sleeve and beyond over the adjacent portions of the tube.

A polyurethane adhesive will serve well as the adhesive, but other adhesives are available.

Before assembling the sleeve on the tube at least its inner surface and preferably the whole surface is coated with an anti-tack plastic material in finely divided or powder form. Finely divided polyvinyl chloride is preferred particularly when the lumen tube also is made from polyvinyl chloride. Once the sleeve is in position, the powdered plastic material can be dissolved from the surface of the sleeve by immersion in a conventional organic cleaning fluid such as cyclohexanone.

The invention will be more particularly described by way of example in relation to the accompanying drawings, which illustrate a Foley type balloon catheter.

Figure 1:
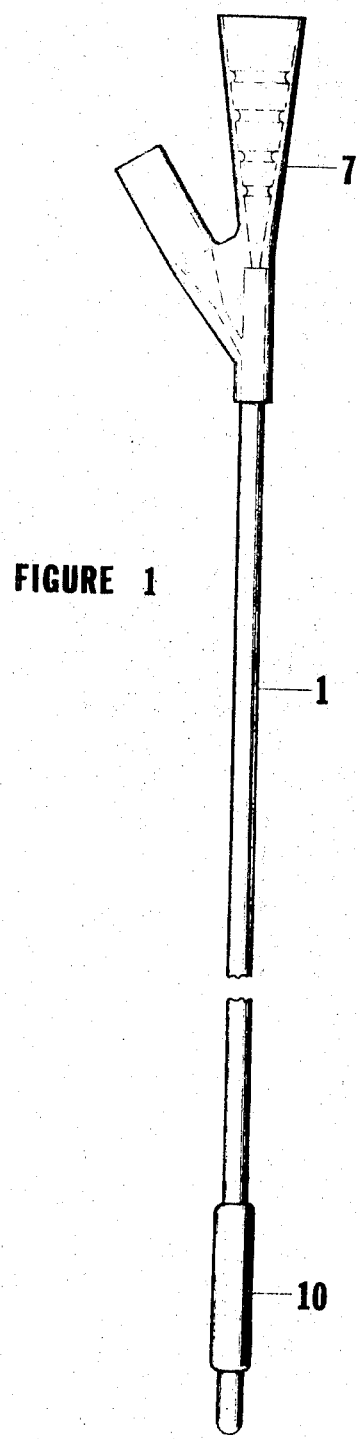
FIG. 1 is an elevational view of the catheter.
Figure 2:
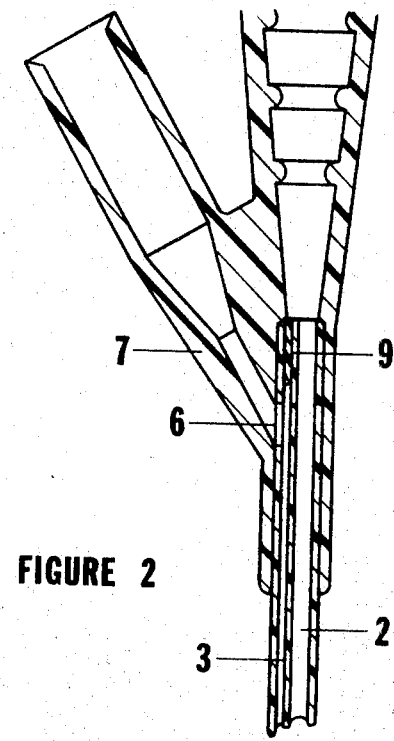
FIG. 2 shows the proximal end of the catheter.
Figure 3:
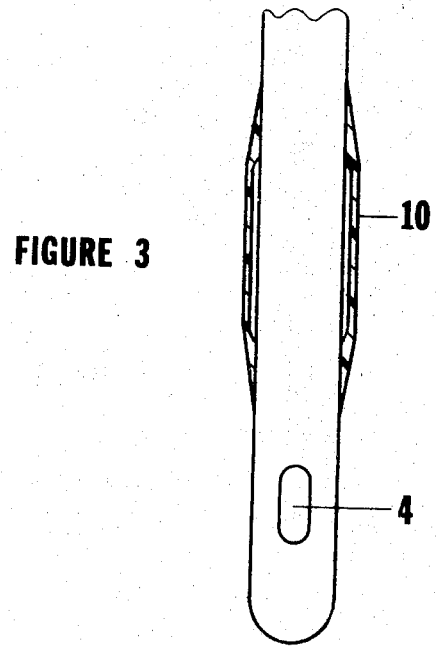
FIG. 3 shows the distal end of the catheter with the balloon sleeve in section.
Figure 4:
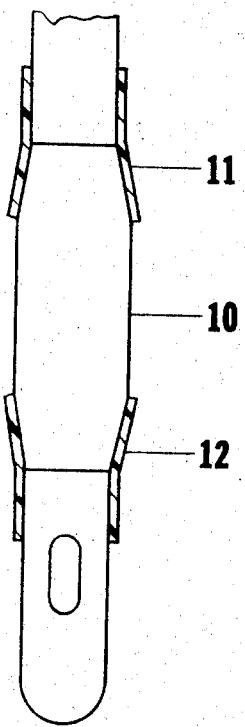
FIG. 4 is a fragmentary view of the distal end of the catheter after adhesively affixing the balloon sleeve and with elastic bands present to ensure pressure contact between the adhering surfaces and a final secure adhesion.
Figure 5:
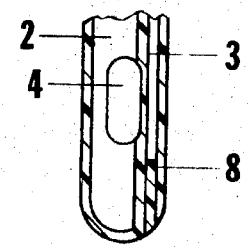
FIG. 5 is a fragmentary section of the distal end of the catheter.
Figure 6:
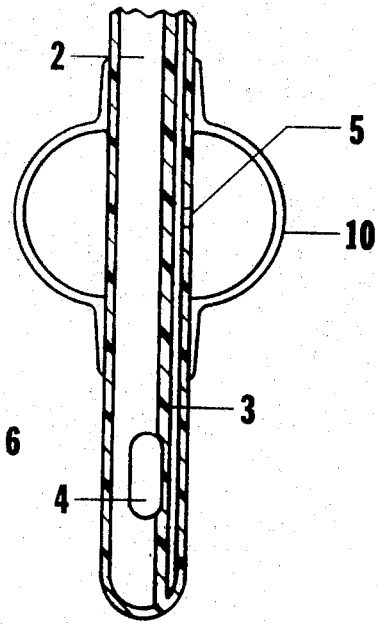
FIG. 6 is a fragmentary sectional view of the distal end of the catheter showing the ballon inflated.

The lumen tube 1 has been cut off from a length of tube extruded with a drainage lumen 2 and an inflation lumen 3. A hole 4 is formed communicating between the drainage lumen and the exterior of the tube and a hole 5 communicating between the inflation lumen and the exterior of the tube. The tube is of plastics material, e.g., plasticized polyvinyl chloride, and may be transparent or semi-transparent. A funnel connecting hole 6 is also formed in the tube communicating between the inflation lumen and the exterior of the tube. The inflation lumen is plugged at the tip (distal) end and at the proximal end by a length 8, 9 respectively of extruded cord or wire which may be of the aforesaid plasticized polyvinyl chloride. The drainage lumen may be plugged at the tip and in the same way. Plugging or closing may however be in any other suitable way, e.g., by an X-ray opaque material.

The tip of the catheter may be shaped as shown in FIGS. 3 to 6 by shaping the end of the extruded tube on a high frequency forming machine.

The funnel 7 of plasticized polyvinyl chloride is located and bonded to the proximal end of the tube, for example, using cyclohexanone/tetrahydrofuran-80/20 blend.

The vulcanized rubber latex balloon sleeve 10 is positioned on the lumen tube to cover the hole 5. The end margins of the sleeve are then turned back to form a flap at each end and at least the surfaces to be adhered, i.e., the outer surface of each flap is cleaned, e.g., with petroleum spirit, and dried for say 5-10 minutes. The sleeve end of the tube is then dipped into a halogen solution for a brief period, e.g., 1 minute.

After drying e.g., in a warm air current, the main tube areas to which the sleeve is to be adhered may be cleaned with a suitable solvent such as cyclohexanone, and dried. A suitable polyurethane adhesive is then applied to the areas of the flaps and tube to be adhered together. The flaps are then folded down onto the tube and surplus adhesive removed as by means of a suitable solvent. Drying may then take place at room temperature e.g., for 2 hours, or for a lesser period at an elevated temperature, say 50°C. for 30 minutes, and any solvent removed and solvent in the adhesive allowed to permeate through the natural rubber. Endless elastic (e.g., vulcanized natural rubber latex) pressure bands are then expanded and drawn over the lumen tube to surround the end margins of the sleeve. The two such pressure bands, i.e. band 11 at one of the sleeve and band 12 at the other end of the sleeve, close down on the adhered flaps and over the adjacent portions of the tube. The internal diameter of the pressure bands should be initially appropriately smaller than the external diameter of the tube. For example where the outside diameter of the tube is 6 mm., the inside diameter of the pressure bands may be 4 mm. A wall thickness of the bands of 0.015 inch serves well. After drying for 24 hours at room temperature, the pressure bands are removed.

The following more specific procedure is preferably employed in producing the catheter.

The balloon sleeve is produced in conventional manner by dipping a former into a solution of latex rubber which is to form the sleeve and subsequently stripping off the formed material from the former and cutting off the requisite length to form the sleeve. The former may be externally of slightly bulbous form where the ballooning part of the sleeve is to be formed. At least the inner surface of the sleeve may be dusted with powdered polyvinyl chloride to render it non-tacky. The sleeve material may first be dusted with such a powder while on the former and what is then the inside surface of the sleeve dusted with the powder after stripping from the former to bring that surface to the outside. The required length of material for the sleeve is appropriately cut off.

Figure 7:
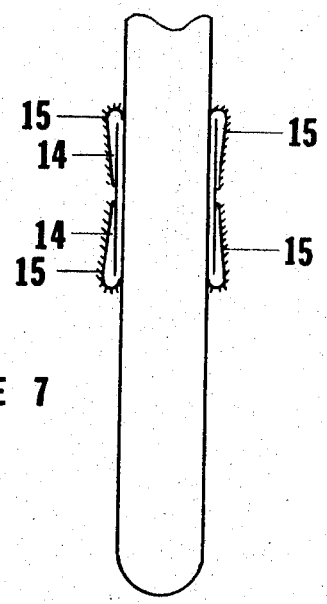
FIG. 7 shows the distal end of the catheter with the end margins of the balloon sleeve turned back ready for immersion in a halogen solution.

After positioning the sleeve on the polyvinyl chloride lumen tube, its end margins are folded back to form annular flaps, (see FIG. 7, which diagrammatically shows the polyvinyl chloride powder 14). The flaps may be cleaned by immersion of the sleeve in a cleaning fluid such as cyclohexanone. The flaps are formed to avoid pressure contact between the inflatable medial part of the sleeve and the lumen tube when said end margins are secured to the tube. However, when the end margins are turned back to form the annular flaps, they tend to apply elastic pressure on the medial part of the sleeve so that this seals off the inflation hole during halogenating. The flaps are advantageously thickened as shown internally, but taper externally to the ends of the sleeve so that no abrupt shoulder will be present at each end of the sleeve when secured to the lumen tube, but that the external surface of the sleeve shall merge with the external surface of the tube. The desired finish is promoted by the use of the elastic bands hereinbefore referred to.

At least the surface regions of the flaps to be adhered to the lumen tube are subjected to the action of the halogen, e.g., chlorine, medium. This may be achieved by dipping the distal end of the tube including the sleeve and preferably someway beyond into a chlorine solution. After drying, the said surface regions may be treated with a suitable volatile cleaning solvent such as cyclohexanone.

Polyurethane adhesive then is applied to the surfaces of the flaps and/or to the surfaces of the lumen tube. The flaps then are folded down onto the lumen tube and any surplus adhesive may be removed e.g., with a cyclohexanone/tetrahydrofuran-80/20 blend. Drying can then take place at room temperature for about 2 hours, or over a shorter period at a suitable elevated temperature, to allow the solvent in the adhesive to permeate through the material of the sleeve.

The elastic bands may be assembled to extend over the end margins of the sleeve and preferably the adjacent portions of the lumen tube and maintain pressure until lasting adhesive connections are made and the end edges of the sleeve made to merge with the exterior surface of the lumen tube to prevent edge projection.

The above embodiments of the invention are not intended to limit the invention as various modifications will be apparent to those skilled in the art without departing from the spirit or scope of this invention.

What is claimed is:

1. A method of producing a catheter in which end margins of a balloon sleeve are adhesively secured to a lumen tube of a material having higher polar properties than that of the sleeve, which method consists of the steps of dusting at least the inner surface of said sleeve with a soluble plastic powder before assembly of the tube and the sleeve;

locating the sleeve in position around the tube;

contacting said plastic powder with an organic cleaning fluid to dissolve the powder at least from the end margins of the sleeve;

exposing at least the end margins of said sleeve to a halogen medium;

adhesively securing said end margins of the sleeve to the tube; and maintaining contact pressure at the adhesively secured end margins by means of at least one elastic band having an interior diameter in its unstressed configuration which is smaller than the outside diameter of the lumen tube.

2. The method as in claim 1, wherein the organic cleaning fluid is cyclohexanone, the halogen medium is an aqueous chlorine solution, the balloon sleeve is of pre-vulcanized natural latex rubber and the lumen tube and plastic powder are of polyvinyl chloride.

3. The method as in claim 2, wherein the end margins of the sleeve, prior to being adhered to the tube, are turned back after location of the sleeve on the tube, and at least the thus exposed inner surfaces of the sleeve are subjected to a halogenating medium, whereafter the exposed inner surfaces of the sleeve are adhered to the tube by an adhesive medium.

4. The method as in claim 3, wherein the end margins are internally thickened and externally tapered to the ends of the sleeve.

5. The method as in claim 4, wherein the elastic bands are assembled to extend over the end margins of the sleeve and over the adjacent portions of the lumen tube, whereby the end edges of the sleeve are made to merge with the exterior surface of the lumen tube, thereby minimizing projection of the sleeve edge above the outside surface of the tube.

* * * * *